United States Patent [19]
Chang et al.

[11] Patent Number: 5,940,554
[45] Date of Patent: Aug. 17, 1999

[54] FIBER OPTIC COUPLING APPARATUS AND METHOD

[75] Inventors: Chin L. Chang, Walnut; Chao Yung Yeh, Rosemead; Michel K. Smith, Cerritos; Keyth M. Smith, Mission Hills; Ricardo A. Rosette, Oxnard; Robert Straede, Woodland Hills, all of Calif.

[73] Assignee: Lightwave Link, Inc., Burbank, Calif.

[21] Appl. No.: 08/862,762

[22] Filed: May 23, 1997

[51] Int. Cl.⁶ .................................................. G02B 6/26
[52] U.S. Cl. .............................................................. 385/22
[58] Field of Search .......................... 385/20–26, 42–44, 385/16, 19, 65–67

[56] References Cited

U.S. PATENT DOCUMENTS 4,896,935  1/1990  Lee .............................................. 385/88
5,600,739  2/1997  Anderson et al. ......................... 385/16

OTHER PUBLICATIONS

Shiraishi et al. Journal of Lightwave Technology Beam Expanding Fiber Using Thermal Diffusion of the Dopant vol. 8, No. 8, pp. 1151–1161 Aug. 1990.

Primary Examiner—Akm E. Ullah
Attorney, Agent, or Firm—Lynn & Lynn

[57] ABSTRACT

A method for coupling light from an input optical fiber into a selected one of a plurality of output optical fibers includes the steps of forming the input optical fiber to include a length of beam expanded fiber, arranging the plurality of output optical fibers in an array and moving an end of the input optical fiber into alignment with a selected one of the plurality of output optical fibers.

31 Claims, 6 Drawing Sheets

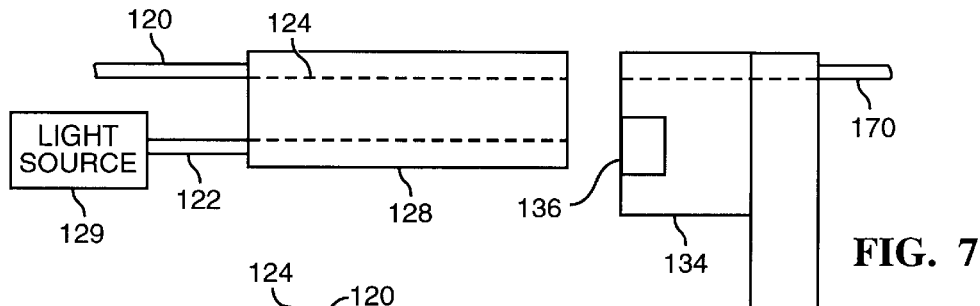
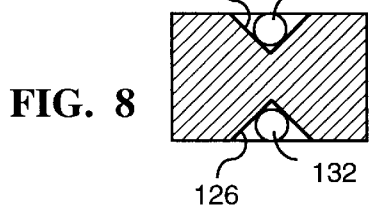
FIG. 8
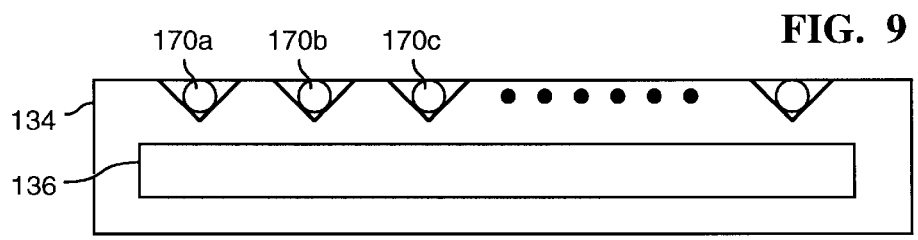
FIG. 9
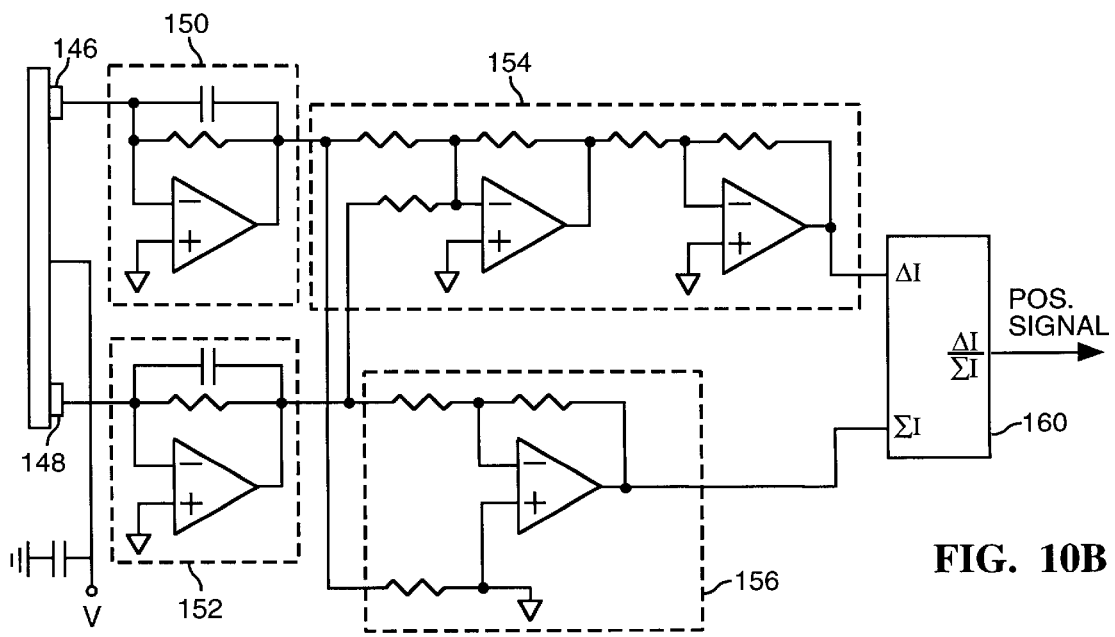
FIG. 10B

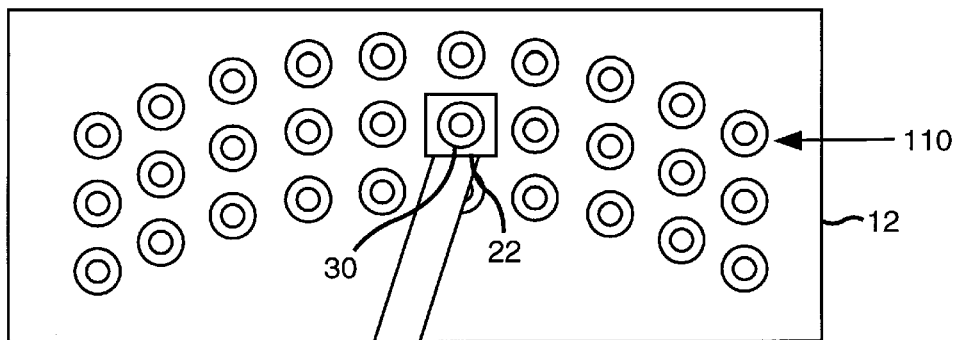
FIG. 14
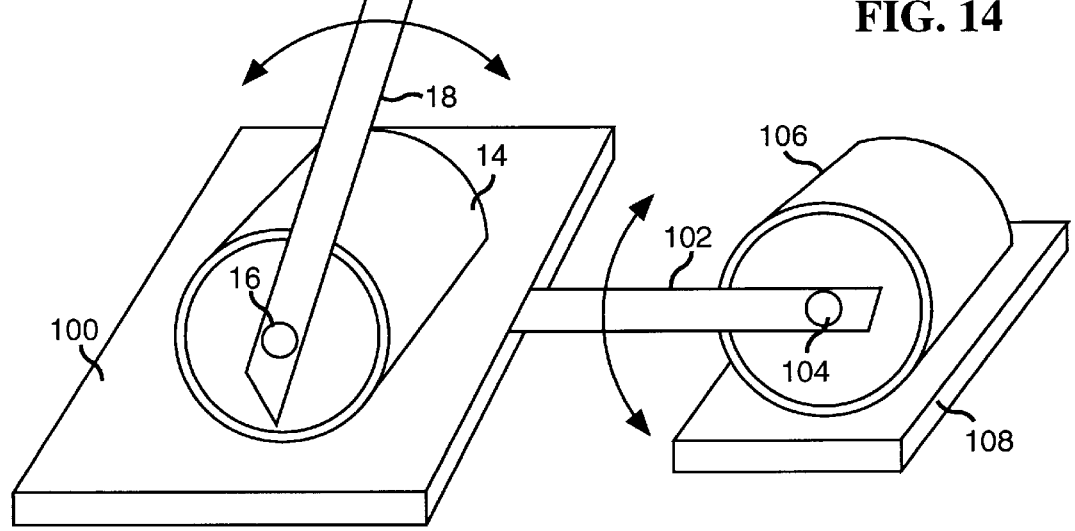
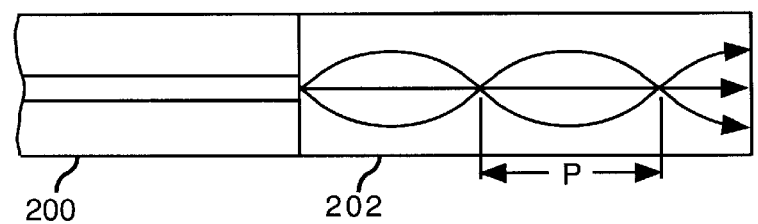
FIG. 15
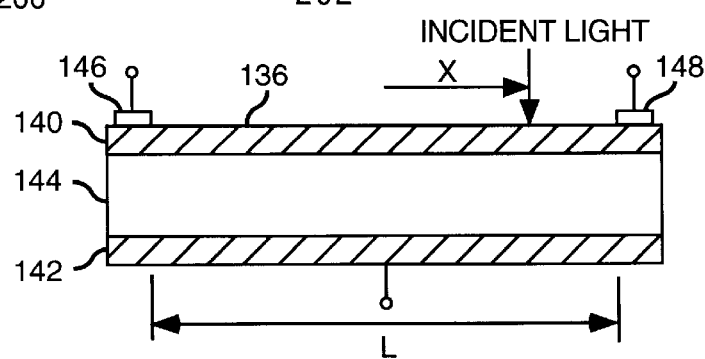
FIG. 10A

FIBER OPTIC COUPLING APPARATUS AND METHOD

BACKGROUND OF THE INVENTION

This invention relates generally to fiber optic communications systems. This invention relates particularly to an apparatus and a method for coupling optical signals from one optical fiber into a selected one of a plurality of optical fibers.

Fiber optic telecommunications systems employ optical fibers for carrying communications signals because such systems have the capability of carrying signals on a large number of channels. Such systems are necessary for meeting the demand for telecommunications channels.

A fiber optic telecommunications system includes switching stations so that communications signals may be routed between any two locations in the network. Each switching station switches signals carried by one optical fiber to a selected one of a plurality of optical fibers for transmission to another switching station in the network.

Systems for switching optical signals between optical fibers include apparatus for placing the fibers end-to-end so that light may be coupled out of one fiber into the other. Direct coupling between single mode fibers is not practical. Therefore lenses are typically used at the ends of the fiber. A first lens expands the light beam output from one of the fibers. A second lens collects the beam output from the first lens and focuses it on the end of the second optical fiber. The use of lens elements makes the coupling device complicated, large, unstable and expensive and requires critical alignment. As the light crosses each interface between media having different refractive index, signal loss occurs due to reflections.

The switching station should be highly reliable and have low insertion loss and high return loss. Insertion loss reduces signal strength, whereas returned, or reflected, signals cause cross talk. The fiber ends must be axially and laterally aligned and must be spaced apart by only a very small distance to meet the operational requirements.

Some present fiber optic switching stations use robots to move the fiber from which a signal is to be extracted to a selected contact point where the signals is coupled into another optical fiber. Robots for this purpose are very expensive and have problems with repeatability in placing the fibers in positions where signals may be satisfactorily extracted from one optical fiber and input into another. Robots are also slow and have limitations on the number of fiber optic channels that may be used.

Other prior art switching apparatus (e.g. U.S. Pat. No. 4,896,935) uses a stepping motor to place the fibers in alignment for signal transmission. Stepping motors have the disadvantages of poor resolution, non-uniform stepping and thermal sensitivity.

Accordingly, there is a need in the art for a reliable, low loss technique for extracting an optical communications signal from one fiber and injecting the signal into a selected one of a plurality of fibers. There is also a need for a system that provides a larger number of channels than present systems.

SUMMARY OF THE INVENTION

This invention overcomes the difficulties involved in aligning an input fiber with a selected one of a plurality of output fibers in a telecommunications switching system so that optical signals may be transferred from the input fiber to the selected output fiber.

The method according to the present invention for coupling light from an input optical fiber into a selected one of a plurality of output optical fibers, comprises the steps of forming the input optical fiber to include a length of beam expanded fiber, mounting the plurality of output optical fibers in a frame, and moving an end of the input optical fiber into alignment with a selected one of the plurality of output optical fibers so that light may be directly coupled from the length of beam expanded fiber into the selected output optical fiber.

The method according to the present invention may further comprise the step of mounting the input optical fiber in an alignment head. The plurality of output optical fibers may be arranged to have ends that are angularly spaced apart along an arc, and the alignment head may be moved along the arc to place the end of the input fiber at a selected location along the arc.

The present invention may further comprise the steps of detecting the position of the end of the input optical fiber, comparing the detected position of the end of the input optical fiber to the selected position to form an error signal, and adjusting the position of the end of the input optical fiber to minimize the error signal.

The present invention may comprise the steps of forming the input optical fiber from a single mode optical fiber and forming the plurality of output optical fibers from single mode optical fibers.

The present invention may also comprise the steps of forming the input optical fiber from a single mode optical fiber and forming the plurality of output optical fibers from multimode optical fibers.

The invention may also comprise apparatus for coupling light from an end of an input optical fiber into a selected one of a plurality of output optical fibers having ends arranged to form a generally planar array. This embodiment of the invention includes a first motor having a first output shaft, a connecting link having a first end connected to the first output shaft, a second motor connected to a second end of the connecting link, the second motor including a second output shaft and a rod mounted to the second output shaft, the input optical fiber being connected to the rod such that rotation of the first and second output shafts moves the end of the input optical fiber into alignment with a selected one of the plurality or output optical fibers.

An appreciation of the objectives of the present invention and a more complete understanding of its structure and method of operation may be had by studying the following description of the preferred embodiment and by referring to the accompanying drawings.

BRIEF DESCRIPTION OF THE DRAWINGS

FIG. 7 illustrates a first position sensing apparatus that may be used to control alignment of the input and output optical fibers;

FIG. 8 is a cross sectional view of a positioning arm included in FIG. 7;

FIG. 9 is a front elevation view of an array of output fibers and a position sensing detector included in the apparatus of FIG. 7;

FIG. 10A illustrates a position sensing device that may be used in the present invention to align the input fiber with a selected one of the output fibers;

FIG. 10B illustrates circuitry that may be included in the position sensing detector of FIG. 9;

FIG. 14 illustrates a second embodiment of the invention for aligning an input fiber with a selected one of an array of output fibers;

FIG. 15 illustrates an end-to-end connection between a single mode optical fiber and a graded-index multimode optical fiber

DESCRIPTION OF THE PREFERRED EMBODIMENT

Figure 1:
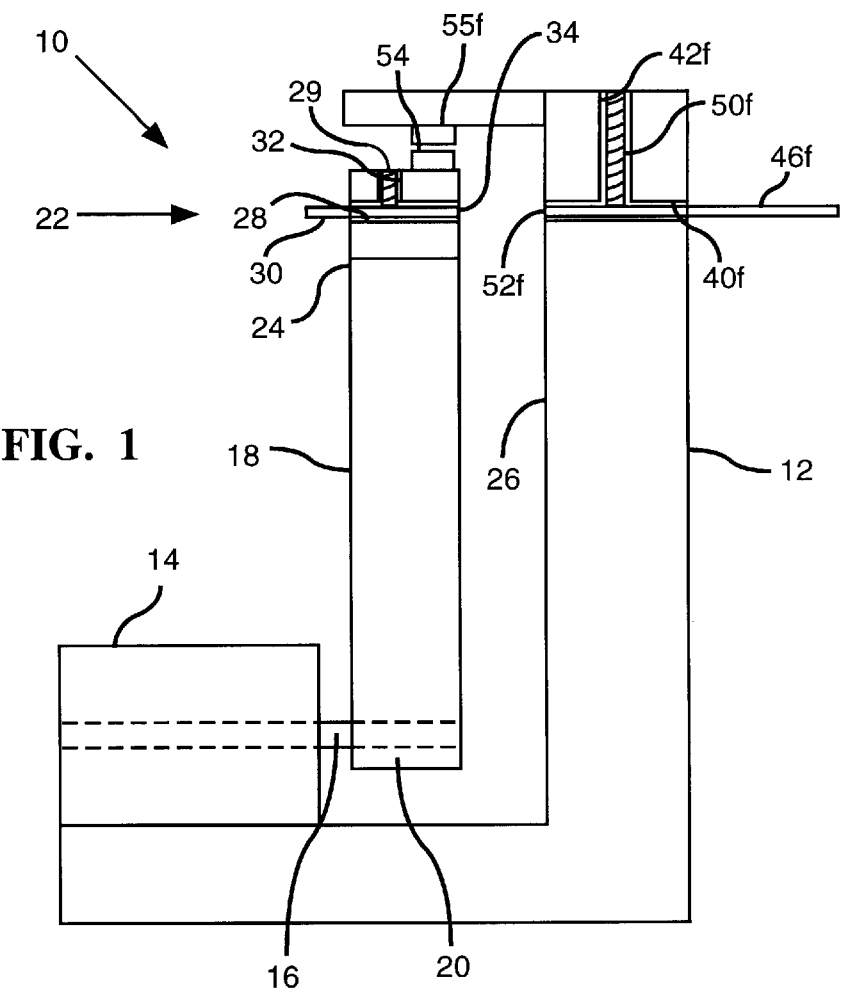
FIG. 1 is a side elevation view illustrating an optical coupling device for coupling optical signals from an input optical fiber into one of a plurality of output optical fibers arranged in an array.
Figure 2:
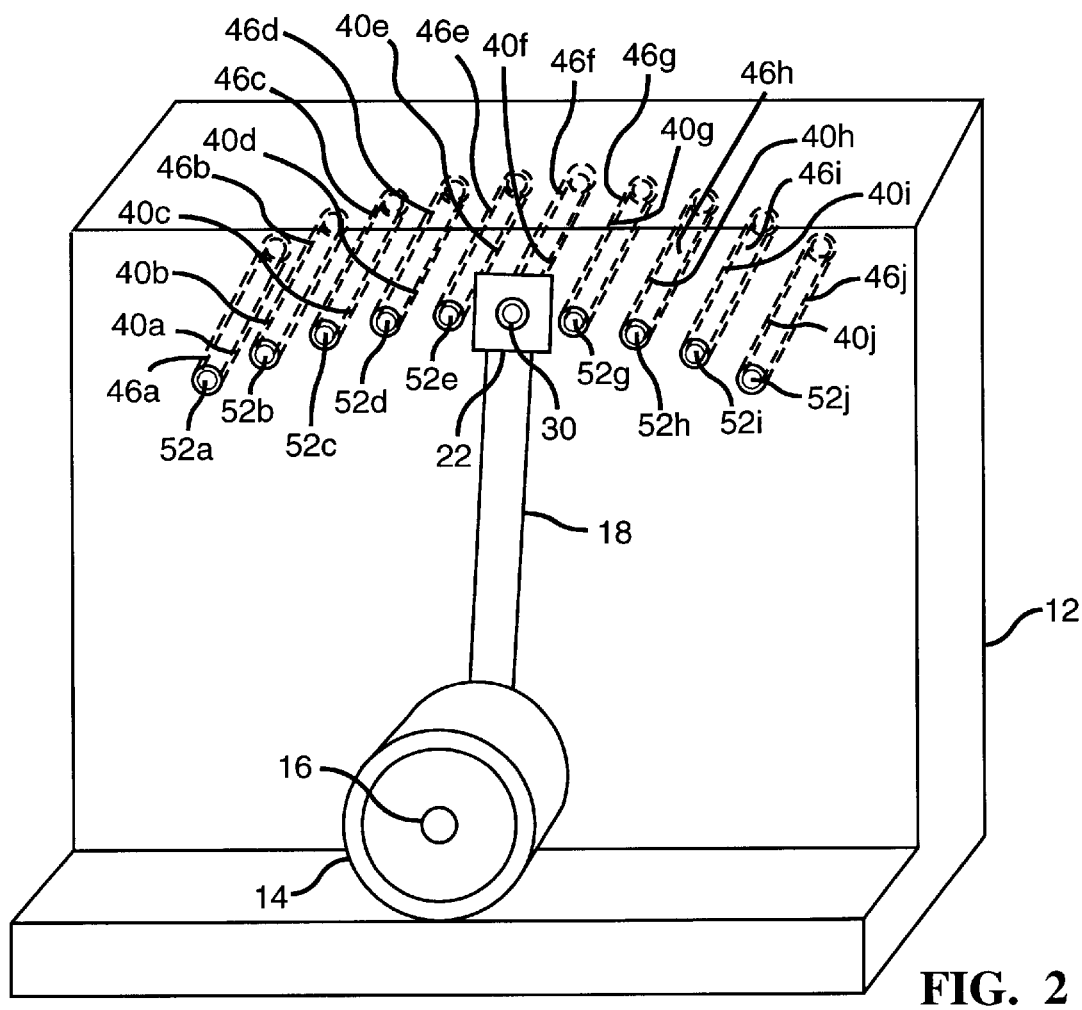
FIG. 2 is a perspective view showing an alignment head and a portion of a frame that may be included in the optical coupling device of FIG. 1.

As shown in FIGS. 1 and 2, a fiber optic switching device 10 according to the present invention includes a frame 12 that may be formed of a suitable metallic or plastic material. In a preferred embodiment of the invention the frame 12 is formed of anodized aluminum. A motor 14 is mounted near the base of the frame 10. In a preferred embodiment of the invention the motor 14 is a galvanometer motor. The motor 14 has a rotary shaft 16. A rod 18 has a first end 20 mounted to the shaft 16 so that rotation of the shaft 16 also rotates the rod 18. The rod 18 is spaced apart from a surface 26 of the frame and is rotatable in a plane that is parallel to the surface 26.

An alignment head 22 is mounted to the other end 24 of the rod 18. A passage 28 is formed in the alignment head 22. The passage 28 is preferably perpendicular to the plane of the surface 26. An optical fiber 30 is placed in the passage 28. The optical fiber 30 may be retained in place by a set screw 29 secured in a passage 32 that intersects the passage 28. The optical fiber 30 has an end surface 34 that is arranged to face the surface 26 of the frame 12.

Figure 3:
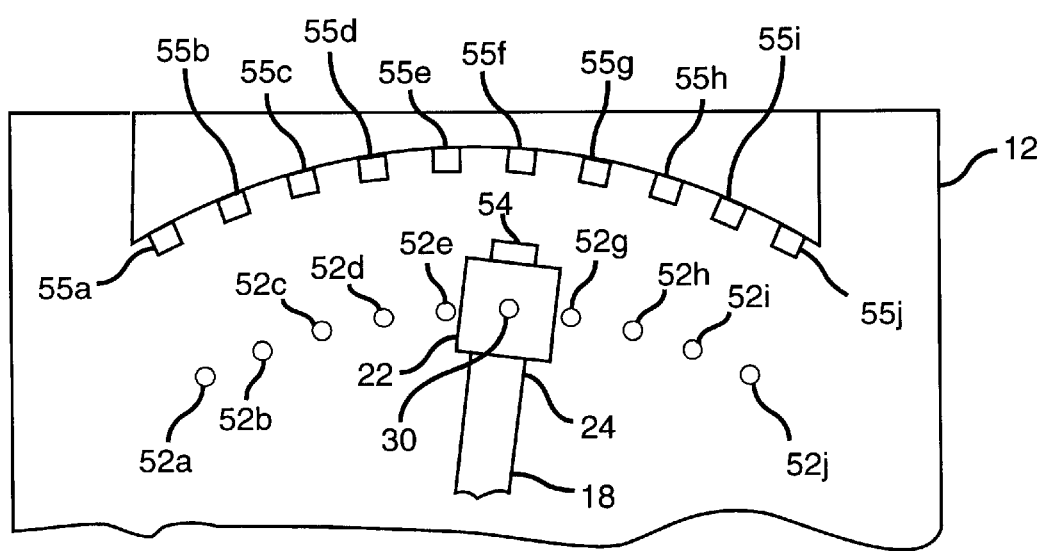
FIG. 3 is a partial front elevation view of the optical coupling device of FIG. 1.

Referring to FIGS. 1–3 the frame 12 has a plurality of passages 40a–40j formed therein. The passages 40a–40j are preferably spaced apart by equal angles along an arc. The passages 40a–40j are also parallel to each other and parallel to the passage 28 when the rod 18 with attached alignment head 22 is properly mounted to the motor shaft 16.

A plurality of optical fibers 46a–46j are placed in the passages 40a–40j, respectively. The optical fibers 46a–46j have end surfaces 52a–52j that face outward from the surface 26 of the frame 12.

The motor 14 preferably provides the capability of rotating the shaft 16 to a predetermined angular position so that the rod 18 and alignment head 22 may be moved to a selected angular position. In particular the fiber end surfaces 52a–52j and the fiber end surface 34 are arranged so that rotation of the rod 18 about the axis of the shaft 16 axially and laterally aligns the fiber end surface 34 with a selected one of the fiber end surfaces 52a–52j. FIGS. 1 and 2 show the alignment head positioned to align optical fiber end 34 with the optical fiber end 52f. When the fiber end surface 34 is aligned with the fiber end surface 52f as shown in FIG. 1, optical communications signals may be coupled from the optical fiber 30 into the optical fiber 46f.

As shown in FIG. 1 a passage 42f is formed in the upper surface of the frame 12. The passage 42f intersects the passage 40f so that a set screw 50f may be used to retain the optical fiber 46f in the passage 40f. Similar passages and set screws may be used to retain the optical fibers 46a–46e and 46g–46j in their respective passages.

The present invention may include a feedback loop for positioning the alignment head so that the fiber 30 is in proper alignment for transferring light to the selected one of the fibers 46a–46j. To implement the feedback loop, the alignment head 22 may have a light source such as a light emitting diode 54 mounted thereto. The light emitting diode 54 emits a narrow beam of light that is incident upon an array of photodetectors 55a–55j. When the fiber end 34 is aligned with the fiber end 52f, the optical signal from the light emitting diode 54 incident upon the photodetector 55f is maximized. The feedback loop adjusts the angular position of the motor shaft 16 until the signal from the photodiode corresponding to the selected output fiber 46a–46j is maximized within a selected tolerance.

The positioning system of the present invention is capable of placing the input fiber at a desired location for alignment with the output fibers 46a–46j to within 10 μrad. In a 100 channel device, the separation between adjacent output fibers may be approximately 200 pm. This spacing is acceptable because of the diameters of the optical fibers and the diameter of the light beam emitted by the input fiber 30. If the arc along which the array of output fibers is formed extends for 90°, then the angular displacement between adjacent output fibers is about 17 mrad. For a 100 fiber array and a linear spacing of 200 μm, the rod 18 will have a length of about 12 mm.

FIG. 14 illustrates apparatus according to the present invention that may be used to form a planar 100×100 array (or larger). The motor 14 with the shaft 16, rod 18, alignment head 22 and optical fiber 30 are arranged as shown in FIG. 1 and described above. Instead of being mounted to the frame 12, the motor 14 in FIG. 14 is mounted to a plate 100. The plate 100 is in turn mounted to a first end of a rod 102. The other end of the rod 102 is fixed to a shaft 104 of a motor 106, which is fixed to a base 108 or the like. By controlling the rotation of the shafts 16 and 104, the alignment head 22 may be moved in a plane to align the optical fiber 30 with a selected member of a fiber optic array 110. The array 110 is shown to as a 3×10 element array only for purposes of illustrating the principles of the invention. It is anticipated that the invention will be used to make arrays of various size, depending upon the desired switching capacity.

Optical signals will not couple in a satisfactory manner directly from an end of one ordinary single mode optical fiber into an end of another such fiber. Direct coupling cannot be accomplished because the core diameter of single mode fibers is too small. The prior art uses lenses to accomplish the necessary coupling. The problems associates with the use of lenses in such devices have already been discussed herein. The present invention overcomes the difficulties of the prior art by modifying the fibers so that lenses are not needed.

Figure 4:
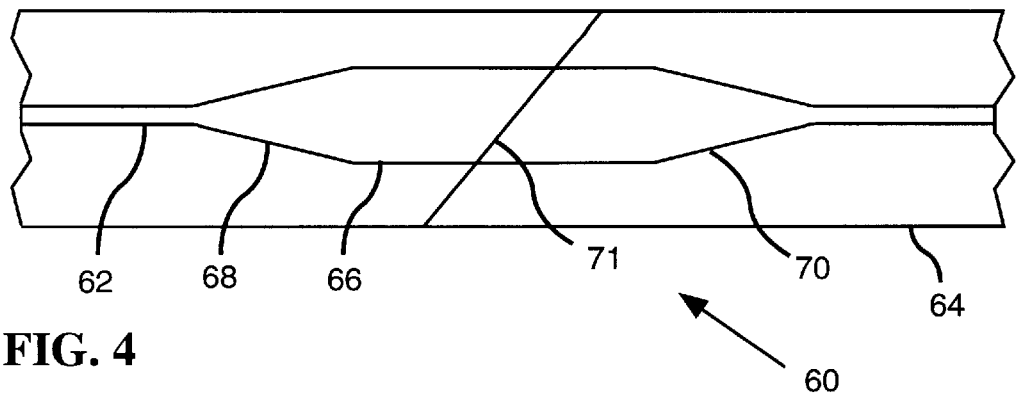
FIG. 4 is a cross sectional view showing the core and cladding of a beam expanded optical fiber.

FIG. 4 illustrates a modification of a single mode optical fiber so that end-to-end coupling can be accomplished without lenses. Referring to FIG. 4 an optical fiber 60 has a core 62 and a cladding 64. Because of the difference between core and cladding diameters, the optical fiber 60 is not drawn to any scale. Optical signals are guided by the core because of total internal reflection at the core/cladding interface.

The core 62 is germanium-doped region of the optical fiber 60 having a normal diameter of about 9 pm. The cladding diameter of a typical single mode optical fiber is about 125 $\mu$m. The core diameter at a region 66 of the optical fiber 60 is expanded by applying heat thereto, which causes the germanium dopant to migrate radially outward. It has been found that application of heat with a microburner to heat the core region 66 to a temperature of about 1250° C. for ten to fifteen minutes expands the diameter of the core region 66 to about 30 $\mu$m.

Heat is applied so that the core region 66 tapers at the ends 68 and 70. Tapering the ends 68 and 70 of the core region 66 causes optical signals to propagate from the 9 $\mu$m diameter normal region of the core 62 to the 30 $\mu$m diameter region 66 without substantial end reflection. Therefore, there is virtually no loss of signal intensity when the diameter of the beam guided by the optical fiber 60 expands from 9 $\mu$m to 30 $\mu$m.

The fiber 60 is then cleaved with an angled end facet along a line 71 near the midpoint of the expanded core region 66. The cleaved region then forms the fiber end 34 discussed above. The cleaved fiber is angled to minimize back reflection. For many sensitive fiber optic systems back reflection can induce excessive noise and laser instability. Cleaving the end of the fiber at an angle faces reduces backward propagation of end face reflections. Properly choosing the cleave angle can reduce back reflections to less than –60 dB.

Figure 5:
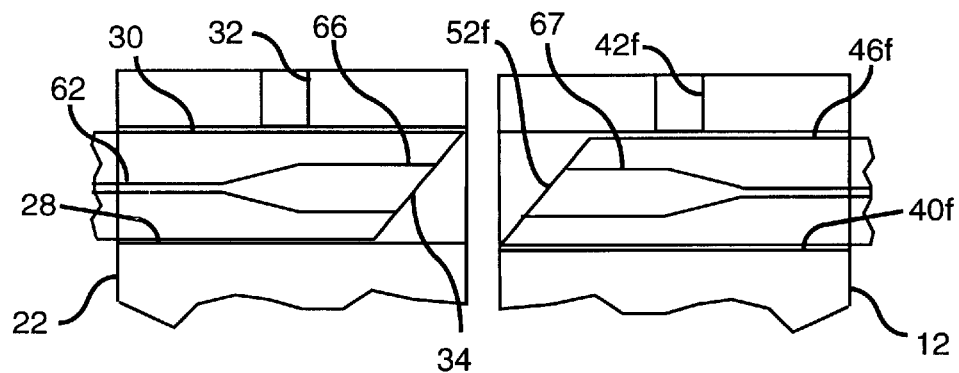
FIG. 5 is a cross sectional view showing a first beam expanded optical fiber mounted in the alignment head and a second beam expanded optical fiber mounted in the frame.

FIG. 5 is an expanded view of the alignment head 22 and a portion of the frame 12 showing the optical fiber 30 aligned with the optical fiber 46ƒ. In the embodiment of FIG. 5, both of the optical fibers 30 and 46ƒ are single mode fibers. The optical fiber 30 preferably is a beam expanded fiber as described above. The use of beam expanded fibers has significant advantages over normal single mode optical fiber. One advantage is that light will propagate out of the end of the beam expanded optical fiber 30 into the end of the beam expanded optical fiber 46ƒ without requiring any lenses. Another advantage is that with a core diameter of 30 $\mu$m, the diameter of the beam output from the end 34 of the fiber 30 is sufficiently large that a lateral misalignment of about 6 $\mu$m is permissible.

The end 34 is a planar surface that makes an oblique angle with the axis of the optical fiber 30. The end 52ƒ of the optical fiber 46ƒ preferably also is formed by cleaving the fiber 46ƒ at the same angle used in forming the fiber end surface 34. The end surfaces are cleaved at an angle that prevents any light extracted from the optical fiber 30 from reflecting at the air-fiber interface at the fiber end 52ƒ back into the optical fiber 30.

Figure 6:
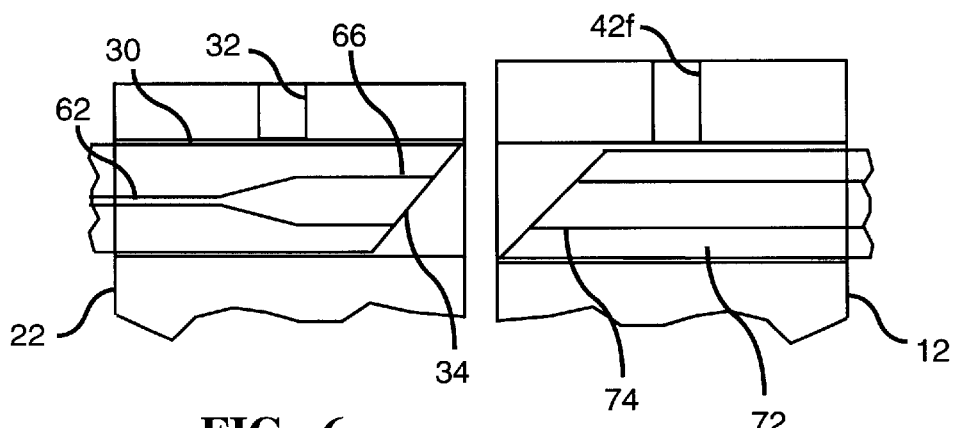
FIG. 6 is a cross sectional view showing an end of a beam expanded single mode optical fiber mounted in the alignment head and adjacent an end of a multimode optical fiber.

FIG. 6 illustrates use of the beam expanded optical fiber 30 to couple light from the single mode optical fiber 30 to a multimode optical fiber 72. The multimode fiber 72 has a core 74 that is about the same diameter as the expanded core region of the single mode optical fiber 30. Light readily couples directly from the expanded single mode core into the multimode core without requiring a lens.

FIGS. 7–9 illustrate still another embodiment of the invention. An input fiber 120 and a position sensing fiber 122 are mounted in corresponding V-grooves 124 and 126, respectively, in an arm 128. The input fiber 120 carries communication signals, and the position sensing fiber 122 carries light received from a light source 129.

An array 170 of output fibers 170a, 170b, etc. is mounted in a frame 134. The output fibers 170a, 170b, etc. have ends that are arranged for selective alignment with the output fiber 120 to receive optical signals therefrom. A position sensing detector 136 is mounted to the frame 134 to receive light from the position sensing fiber 122. The position sensing fiber 122 and the position sensing detector 136 are used to determine which of the fibers 170a, 170b, etc. is aligned with the input fiber 120 and to allow the degree of alignment required between a selected one of the fibers 170a, 170b, etc. and the input fiber 120.

Suitable position sensing detectors are commercially available. FIG. 10A illustrates the basic structure of the position sensing detector 136. A P-layer 140 and an N-layer 142 are separated by an I-layer 144 and mounted on a suitable planar silicon substrate (not shown). A pair of electrodes 146 and 148 separated by a length L are mounted near the ends of the layer 140. A beam of incident light from the position sensing fiber 122 is incident upon the P-layer 140 at a location spaced a distance X from the center of the position sensing detector 136.

When a light spot falls on the position sensing detector 136, an electric charge proportional to the optical energy is generated at the incident position X. The electric charge is driven through the resistive P-layer 140 and collected by the electrodes 146 and 148. The P-layer 140 has uniform resistivity so that the photocurrent collected by the electrodes 146 and 148 is inversely proportional to the distance between the incident position X and the electrode.

FIG. 10B illustrates an operating circuit for the one dimensional position sensing device 136. Preamplifier circuits 150 and 152 collect photocurrent from the electrodes 146 and 148 A first summing circuit 154 is connected to the outputs of the preamplifier circuits 150 and 152. The summing circuit 154 is arranged to provide a signal that indicates the sum $\Sigma$I of the photocurrents. A second summing circuit 156 connected to the outputs of the preamplifier circuits 146 and 148 provides a signal $\Delta$I that indicates the difference of the photocurrents. The signals $\Delta$I and $\Sigma$I are input to an analog divider 160 that calculates the position of the incident light on the position sensing detector as a function of the sum and difference of the two photocurrents.

Figure 11:
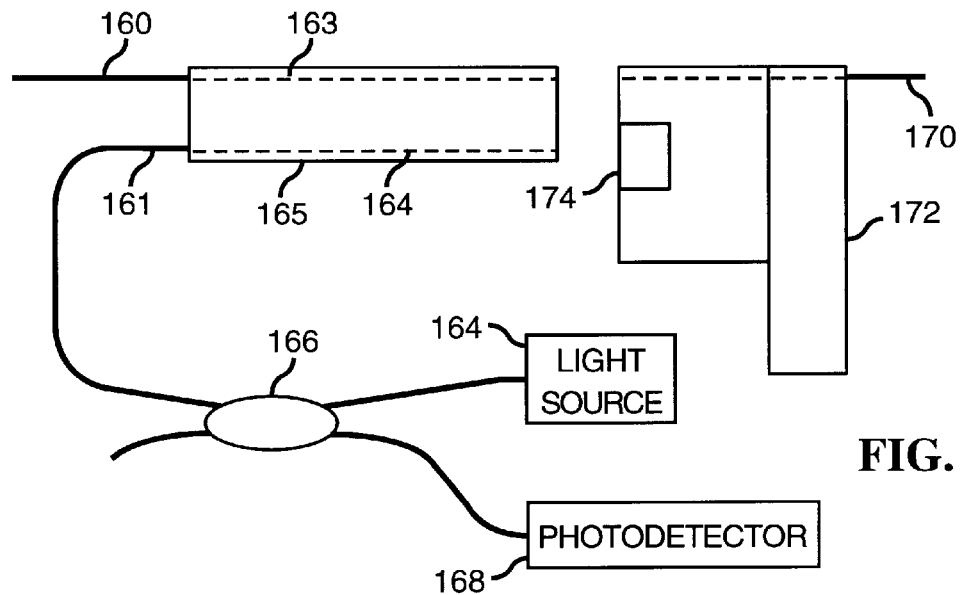
FIG. 11 illustrates a feedback system for controlling the position of the alignment head of FIGS. 1–3.

FIG. 11 illustrates another embodiment of the invention. An input fiber 160 and a pick-up fiber 161 are mounted in respective V-grooves 163 and 164 formed in a support arm 165. The input fiber 160 carries telecommunications signals as previously described. The pick-up fiber 162 receives light from a light source 164 via a fiber optic coupler 166, which is preferably a 3 dB device. An optical fiber 164 connects a photodetector 168 to the coupler 166.

Figure 12:
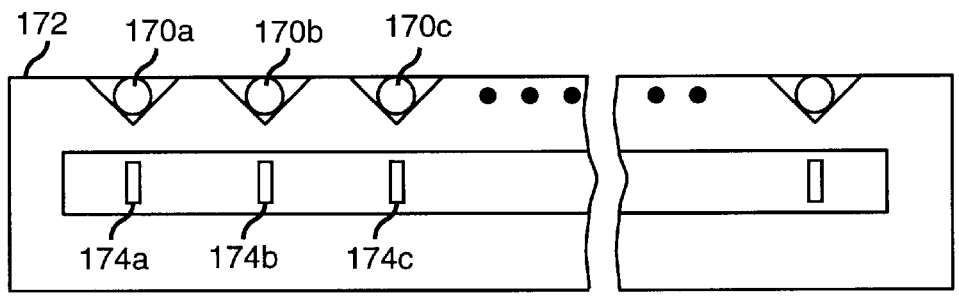
FIG. 12 illustrates a fiducial array that may be included in the apparatus of FIG. 7 for aligning the input fiber with a selected one of the output fibers.
Figure 13:
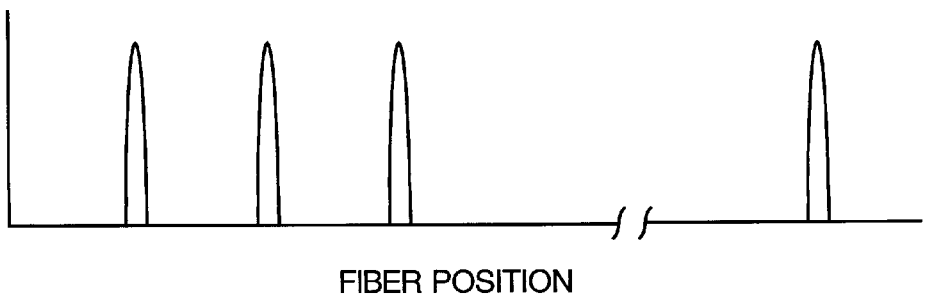
FIG. 13 graphically illustrates light intensity as a function of position in the fiducial array of FIG. 8.

Referring to FIGS. 11–13, a plurality of output fibers 170a, 170b etc. is mounted in a frame 172 and arranged such that the input fiber 160 may be aligned therewith. A fiducial array 174 is mounted to the frame 172 such that a plurality of fiducials 174a, 174b etc. are arranged in corresponding relationship to the plurality of output fibers 170*a*, 170*b* etc. Light emitted from the pick-up fiber 161 impinges upon the fiducial array 174 and then reflects back into the pick-up fiber 162. The fiber 162 then guides the reflected light back to the coupler 166, which directs part of the reflected light to the photodetector 168. The position of the support arm 165 may be adjusted to maximize the photodetector output for each fiducial. FIG. 13 shows the light intensity as a function of fiber position.

FIG. 15 illustrates beam expansion using a single mode fiber 200 and a graded-index multimode fiber 202. Graded-index fiber is produced with a core refractive index that gradually changes from its maximum at the center to match the cladding index at the core/cladding interface. Because the refractive index decreases from the center of the core to the core/cladding interface, light rays travel faster the closer they are to the interface. This compensates for the greater distances traveled by the light rays of the higher-order modes. The rays travel in curved paths as illustrated in FIG. 15 and have a periodicity characterized by a pitch distance P.

The single mode fiber 200 and the multimode fiber 202 are fused together end-to-end. In this case the graded-index multimode fiber can produce a collimated light beam with a substantial beam aperture, which is typically greater than 30 μm if the length of the multimode fiber is chosen such that it is equal to an odd multiple of the half pitch distance P of the light waves in the graded-index multimode fiber 202.

Figure 16:
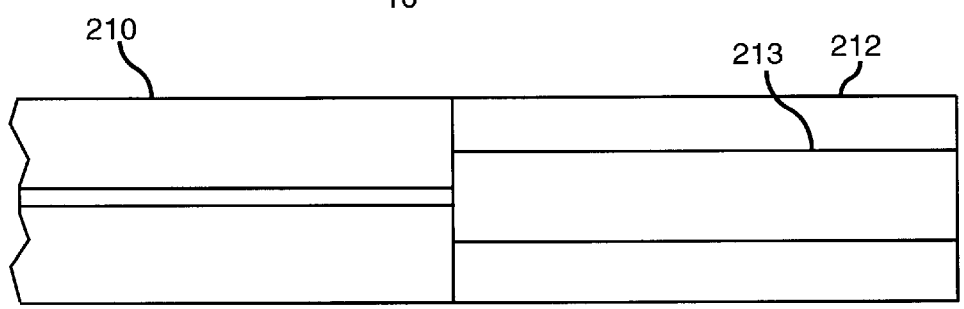
FIG. 16 illustrates an end-to-end connection between a single mode optical fiber and a step-index multimode optical fiber.

FIG. 16 illustrates using a single mode fiber 210 and a step index fiber 212 for beam expansion. The fibers 210 and 212 are fused together end-to-end so that the input light beam from the single mode fiber 210 expands in the core of the multimode fiber 212.

Figure 17:
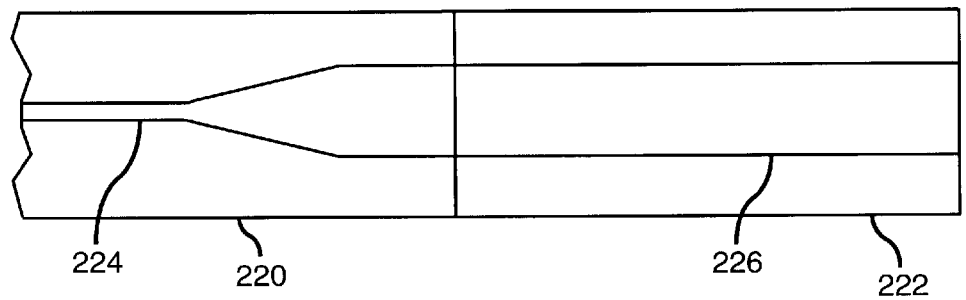
FIG. 17 illustrates an end-to-end connection between a beam expanded single mode optical fiber and a step-index multimode optical fiber.

FIG. 17 illustrates another technique for beam expansion using a single mode fiber 220 and a step index multimode fiber 222. The single mode fiber 220 is thermally treated to expand its core 224 to a diameter that is approximately equal to the diameter of the core 226 of the multimode fiber 222.

Exemplary embodiments of the invention are described herein to explain how to make and use the invention. In actual practice, modifications may be made. The limitations are the fiber diameter, the minimum acceptable space between adjacent fibers and the permissible error in aligning the transmit and output fibers. The described embodiments are to be considered in all respects as exemplary and illustrative rather than restrictive. Therefore, the appended claims rather than the foregoing descriptions define the scope of the invention. All modifications to the embodiments described herein that come within the meaning and ranges of equivalence of the claims are embraced within the scope of the invention.

What is claimed is:

1. A method for coupling light from an input optical fiber into a selected one of a plurality of output optical fibers, comprising the steps of:
   forming the input optical fiber to include a length of beam expanded fiber;
   arranging the plurality of output optical fibers in an array;
   arranging an analog motor for moving an end of the input optical fiber into alignment with a selected one of the plurality of output optical fibers so that light may be directly coupled from the length of beam expanded fiber into the selected output optical fiber;
   controlling the analog motor with a position control apparatus that includes a feedback loop for to continuously adjust the alignment of the input optical fiber and the selected output optical fiber to provide maximum coupling of light from the input optical fiber into the selected output optical fiber.

2. The method of claim 1, further comprising the steps of mounting the input optical fiber in an alignment head; forming the input optical fiber and the output optical fibers to have angled end faces and arranging the input optic fiber and the plurality of output optical fibers so that the end faces of the input optical fiber and the end face of the output optical fiber selected for coupling are spaced apart by about 20 μm.

3. The method of claim 2, further comprising the steps of:
   arranging the plurality of output optical fibers to have ends that are angularly spaced apart along an arc; and
   moving the alignment head along the arc to place the end of the input fiber at a selected location along the arc.

4. The method of claim 3, further comprising the steps of:
   providing a motor having a rotatable shaft;
   mounting the alignment head to the shaft such that rotation of the shaft moves the alignment head along the arc.

5. The method of claim 1, further comprising the steps of:
   detecting the position of the end of the input optical fiber;
   comparing the detected position of the end of the input optical fiber to the selected position to form an error signal; and
   adjusting the position of the end of the input optical fiber to minimize the error signal.

6. The method of claim 5 wherein the step of detecting the position of the end of the input optical fiber includes the steps of:
   mounting a light source on the alignment head;
   arranging a plurality of photodetectors to correspond to the plurality of output optical fibers so that alignment of the end of the input optical fiber illuminates a selected photodetector.

7. The method of claim 1, further comprising the steps of:
   forming the input optical fiber from a single mode optical fiber; and
   forming the plurality of output optical fibers from single mode optical fibers.

8. The method of claim 1, further comprising the steps of:
   forming the input optical fiber from a single mode optical fiber; and
   forming the plurality of output optical fibers from multimode optical fibers.

9. The method of claim 1, further comprising the steps of:
   forming the input optical fiber to include a single mode optical fiber; and
   coupling a first end of a length of a step-index multimode fiber to an end of the single mode fiber to receive a light beam therefrom such that the light beam has a diameter that expands to the core diameter of the multimode fiber.

10. The method of claim 1, further comprising the steps of:
    forming the input optical fiber to include a single mode optical fiber; and
    coupling a first end of a length of a graded-index multimode fiber to an end of the single mode fiber to receive a light beam therefrom such that the light beam has a diameter that expands to the core diameter of the multimode fiber.

11. The method of claim 10 further including the step of forming the length of the graded-index multimode fiber to equal and odd multiple of the half-pitch of the light beam therein.

12. The method of claim 1, further comprising the steps of:
- forming the input fiber of a single mode fiber; and
- tapering the core of the input optical fiber from an expanded diameter core portion to a normal diameter core portion in the single mode fiber.

13. Apparatus for coupling light from an input optical fiber into a selected one of a plurality of output optical fibers, comprising:
- an expanded core portion having an expanded diameter formed in the input optical fiber adjacent an end thereof such that light propagates in the input optical fiber from a normal core portion to the expanded core portion for extraction from the input optical fiber;
- a frame arranged to hold the plurality of output optical fibers in an array such that the output optical fibers have exposed ends;
- an analog motor arranged for moving the end of the input optical fiber into alignment with a selected one of the ends of the plurality of output optical fibers so that light may be directly coupled from the expanded diameter core portion of the input optical fiber into the selected output optical fiber: and
- a position control apparatus that includes a feedback loop for controlling the analog motor to continuously adjust the alignment of the input optical fiber and the selected output optical fiber to provide maximum coupling of light from the input optical fiber into the selected output optical fiber.

14. The apparatus of claim 13, further comprising an alignment head arranged to hold the input optical fiber and wherein the input optical fiber and the output optical fibers each have angled end faces and wherein the input optic fiber and the plurality of output optical fibers are arranged so that the end faces of the input optical fiber and the end face of the output optical fiber selected for coupling are spaced apart by about 20 m.

15. Apparatus for coupling light from an input optical fiber into a selected one of a plurality of output optical fibers, comprising:
- an expanded core portion having an expanded diameter formed in the input optical fiber adjacent an end thereof such that light propagates in the input optical fiber from a normal core portion to the expanded core portion for extraction from the input optical fiber;
- a frame arranged to hold the plurality of output optical fibers in an array such that the output optical fibers have exposed ends;
- apparatus for moving the end of the input optical fiber into alignment with a selected one of the ends of the plurality of output optical fibers so that light may be directly coupled from the expanded diameter core portion of the input optical fiber into the selected output optical fiber;
- apparatus for detecting the position of the end of the input optical fiber;
- apparatus for comparing the detected position of the end of the input optical fiber to the selected position to form an error signal; and
- apparatus for adjusting the position of the end of the input optical fiber to minimize the error signal.

16. The apparatus of claim 15 wherein the apparatus for detecting the position of the end of the input optical fiber includes:
- a light source mounted to the alignment head;
- a plurality of photodetectors arranged to correspond to the plurality of output optical fibers so that alignment of the end of the input optical fiber illuminates a selected photodetector.

17. The apparatus of claim 15, wherein the input and output optical fibers comprise single mode optical fiber.

18. The apparatus of claim 15, wherein the input optical fibers comprises a single mode optical fiber and the output optical fibers each comprise multimode optical fibers.

19. The apparatus of claim 15, wherein the core of the input optical fiber is tapered from the expanded diameter core portion to the normal diameter core portion.

20. The apparatus of claim 15, wherein the input optical fiber includes a single mode optical fiber; and the plurality of output optical fibers comprise multimode optical fibers.

21. Apparatus for coupling light from an input optical fiber into a selected one of a plurality of output optical fibers, comprising:
- an expanded core portion having an expanded diameter formed in the input optical fiber adjacent an end thereof such that light propagates in the input optical fiber from a normal core portion to the expanded core portion for extraction from the input optical fiber;
- a frame arranged to hold the plurality of output optical fibers in an array such that the output optical fibers have exposed ends;
- apparatus for moving the end of the input optical fiber into alignment with a selected one of the ends of the plurality of output optical fibers so that light may be directly coupled from the expanded diameter core portion of the input optical fiber into the selected output optical fiber;
- wherein the input optical fiber; includes:
- a single mode optical fiber; and
- a first end of a length of a step-index multimode fiber coupled to an end of the single mode fiber to receive a light beam therefrom such that the light beam has a diameter that expands to the core diameter of the multimode fiber.

22. Apparatus for coupling light from an input optical fiber into a selected one of a plurality of output optical fibers, comprising:
- an expanded core portion having an expanded diameter formed in the input optical fiber adjacent an end thereof such that light propagates in the input optical fiber from a normal core portion to the expanded core portion for extraction from the input optical fiber;
- a frame arranged to hold the plurality of output optical fibers in an array such that the output optical fibers have exposed ends;
- apparatus for moving the end of the input optical fiber into alignment with a selected one of the ends of the plurality of output optical fibers so that light may be directly coupled from the expanded diameter core portion of the input optical fiber into the selected output optical fiber;
- wherein the input optical fiber includes: a single mode optical fiber; and
- a first end of a length of a graded-index multimode fiber coupled to an end of the single mode fiber to receive a light beam therefrom such that the light beam has a diameter that expands to the core diameter of the multimode fiber.

23. The apparatus of claim 22 wherein the length of the graded-index multimode fiber is equal to and odd multiple of the half-pitch of the light beam therein.

24. Apparatus for coupling light from an end of an input optical fiber into a selected one of a plurality of output optical fibers having ends arranged to form a generally planar array, comprising:

a first motor having a first output shaft;

a connecting link having a first end connected to the first output shaft;

a second motor connected to a second end of the connecting link, the second motor including a second output shaft;

a rod mounted to the second output shaft, the input optical fiber being connected to the rod such that rotation of the first and second output shafts moves the end of the input optical fiber into alignment with a selected one of the plurality or output optical fibers; and a position control apparatus that includes a feedback loop for controlling the first and second motors to continuously adjust the alignment of the input optical fiber and the selected output optical fiber to provide maximum coupling of light from the input optical fiber into the selected output optical fibers.

25. The apparatus of claim 24 wherein the input optical fiber includes a beam expanded fiber.

26. The apparatus of claim 25, wherein the input optical fibers comprises a single mode optical fiber and the output optical fibers each comprise multimode optical fibers.

27. The apparatus of claim 26, wherein the core of the input optical fiber is tapered from the expanded diameter core portion to the normal diameter core portion.

28. The apparatus of claim 25, wherein the input optical fiber includes a single mode optical fiber the plurality of output optical fibers comprise multimode optical fibers.

29. The apparatus of claim 25, wherein the input optical fiber includes a single mode optical fiber and a first end of a length of a step-index multimode fiber coupled to an end of the single mode fiber to receive a light beam therefrom such that the light beam has a diameter that expands to the core diameter of the multimode fiber.

30. The apparatus of claim 25, wherein the input optical fiber includes a single mode optical fiber and a first end of a length of a graded-index multimode fiber coupled to an end of the single mode fiber to receive a light beam therefrom such that the light beam has a diameter that expands to the core diameter of the multimode fiber.

31. The apparatus of claim 30 wherein the length of the graded-index multimode fiber is equal to and odd multiple of the half-pitch of the light beam therein.

* * * * *